US012745157B2

(12) United States Patent
Sassenrath et al.

(10) Patent No.: US 12,745,157 B2
(45) Date of Patent: Sep. 22, 2026

(54) MESH NETWORK RELAY

(71) Applicant: ROKU, INC., San Jose, CA (US)

(72) Inventors: Carl Sassenrath, Ukiah, CA (US); Robert C. Curtis, Napa, CA (US); Manas C. Saksena, San Jose, CA (US); Gregory M Garner, Key Colony Beach, FL (US); Scott E. De Haas, Austin, TX (US); David L. Stern, Los Gatos, CA (US)

(73) Assignee: ROKU, INC., San Jose, CA (US)

( * ) Notice: Subject to any disclaimer, the term of this patent is extended or adjusted under 35 U.S.C. 154(b) by 200 days.

(21) Appl. No.: 18/377,055

(22) Filed: Oct. 5, 2023

(65) Prior Publication Data

US 2025/0119812 A1 Apr. 10, 2025

(51) Int. Cl.
*H04W 40/12* (2009.01)
*H04W 40/22* (2009.01)
*H04W 84/18* (2009.01)

(52) U.S. Cl.
CPC ........... *H04W 40/12* (2013.01); *H04W 40/22* (2013.01); *H04W 84/18* (2013.01)

(58) Field of Classification Search
None
See application file for complete search history.

(56) References Cited

U.S. PATENT DOCUMENTS

2009/0268718 A1* 10/2009 Liao ........................ H04L 43/55 370/352
2016/0242099 A1* 8/2016 Floberg ................. H04W 40/08
2018/0295529 A1* 10/2018 Jen ........................ H04W 24/04
2019/0075040 A1* 3/2019 Ghosh ................. H04L 43/0852
2020/0288373 A1* 9/2020 Kharvar ................ H04W 40/02
2020/0396153 A1* 12/2020 Campora .............. H04W 84/18
2022/0103420 A1* 3/2022 Sasaki ..................... H04L 41/16
2023/0016946 A1 1/2023 Wouhaybi et al.
2025/0095457 A1* 3/2025 Riise ................ G08B 13/19656

FOREIGN PATENT DOCUMENTS

WO WO-2018/220443 A1 12/2018

OTHER PUBLICATIONS

Extended European Search Report for EP Application No. EP24204515.1, dated Feb. 14, 2025, 10 Pages.

* cited by examiner

*Primary Examiner* — Brian S Roberts

(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for relaying data in a mesh network. In an embodiment, characteristics for each of a plurality of nodes that comprise a mesh network are obtained. Based on the characteristics, a relay path for providing data from a source node from the plurality of nodes to a destination node from the plurality of nodes is determined. The relay path comprises the source node, the destination node and at least one relay node from the plurality of nodes. An indication of the relay path is provided to at least one of the source node, the destination node, or the at least one relay node.

20 Claims, 9 Drawing Sheets

600

| 2 | 2 | 6 | 6 | 6 | 2 | | 4 |
|---|---|---|---|---|---|---|---|
| Frame Control 602 | Duration 604 | Broadcast MAC 606 | Source MAC 608 | Mesh Network MAC 610 | Seq. 612 | Payload 614 | FCS 616 |

| 2 | 2 | 6 | 6 | 6 | 2 | | 4 |
|---|---|---|---|---|---|---|---|
| Frame Control 602 | Duration 604 | Desitination MAC 606 | Source MAC 608 | Mesh Network MAC 610 | Seq. 612 | Payload 614 | FCS 616 |

FIG. 6B

MESH NETWORK RELAY

BACKGROUND

Field

This disclosure is generally directed to mesh networks.

SUMMARY

Provided herein are system, apparatus, device, method and/or computer program product embodiments, and/or combinations and sub-combinations thereof, for relaying data in a mesh network. In an embodiment, characteristics for each of a plurality of nodes that comprise a mesh network are obtained. Based on the characteristics, a relay path for providing data from a source node from the plurality of nodes to a destination node from the plurality of nodes is determined. The relay path comprises the source node, the destination node and at least one relay node from the plurality of nodes. An indication of the relay path is provided to at least one of the source node, the destination node, or the at least one relay node.

In an embodiment, the at least one relay node is configured to transmit and receive the data via a Wi-Fi-based communication protocol and is unassociated with an access point.

In another embodiment, at least one of the source node, the destination node, or the at least one relay node comprises at least one of an Internet-of-Things (IoT) device, a television, a sound bar, a computing device, an application, or a smart phone.

In yet another embodiment, determining the relay path comprises providing a representation of the characteristics to a machine learning-based classification model and receiving an output generated by the machine learning-based classification model that corresponds to the indication of the relay path.

In still another embodiment, the characteristics comprise at least one of: a throughput for each of the plurality of nodes; for each node of the plurality of nodes, a received signal strength with respect to one or more other nodes in the plurality of nodes; for each node of the plurality of nodes, a signal-to-noise ratio with respect to the one or more other nodes in the plurality of nodes; a modulation coding scheme utilized by each of the plurality of nodes; an indication of operational behavior for each of the plurality of nodes; or for each node of the plurality of nodes, an indication of a periodicity at which a beacon signal is received from at least one other node of the plurality of nodes.

In a further embodiment, the at least one relay node comprises a first access point and a second access point communicatively coupled via the Internet.

In yet a further embodiment, the indication of the relay path comprises at least one of a first identifier of a first node from the plurality of nodes in the relay path from which the at least one relay node receives the data, or a second identifier of a second node from the plurality of nodes in the relay path to which the data is to be transmitted by at the least one relay node.

BRIEF DESCRIPTION OF THE FIGURES

The accompanying drawings are incorporated herein and form a part of the specification.

FIG. 6A is a block diagram of a beacon media access control (MAC) frame, according to some embodiments.

FIG. 6B is a block diagram of a unicast MAC frame, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Data communication networks may include various hubs, switches, routers, and other network devices, interconnected and configured to handle data as it passes through the network. Such devices may be used to form a mesh network, where a plurality of network devices form multiple paths for data transmission. In such a configuration, data and/or commands originating from a source network device may be relayed via other network devices in the mesh network until it reaches a destination network device. However, the effectiveness of the path via which data is relayed may be hindered due to various factors, such as distance between devices in the path, signal path barriers, or signal interference.

Embodiments described herein may address some or all of the foregoing issues related to mesh networks. For instance, various characteristics of a plurality of devices (or nodes) that comprise a mesh network may be determined. The characteristics may be indicative of at least certain signal characteristics, the throughput, and operational behavior of such devices. Such characteristics may be analyzed to determine an improved or optimal (e.g., most effective) relay path for relaying data and/or commands via the devices. The devices in the improved or optimal relay path may each be provided a relay mapping that indicates a particular first device in the path data is to be relayed when received from a second particular device in the path.

For example, in embodiments, characteristics for each of a plurality of nodes that comprise a mesh network are obtained. Based on the characteristics, a relay path for providing data from a source node from the plurality of nodes to a destination node from the plurality of nodes is determined. The relay path comprises the source node, the destination node and at least one relay node from the plurality of nodes. An indication of the relay path is provided to at least one of the source node, the destination node, or the at least one relay node.

By determining and utilizing the most effective relay path to relay data, the reliability of the communication links between nodes in the path is improved, and therefore, data and/or commands are reliability transmitted to intended nodes. Accordingly, the techniques described herein improve the functioning of a system (e.g., a mesh network), as nodes in the network properly receive data and/or commands and perform their functions as intended.

Figure 1:
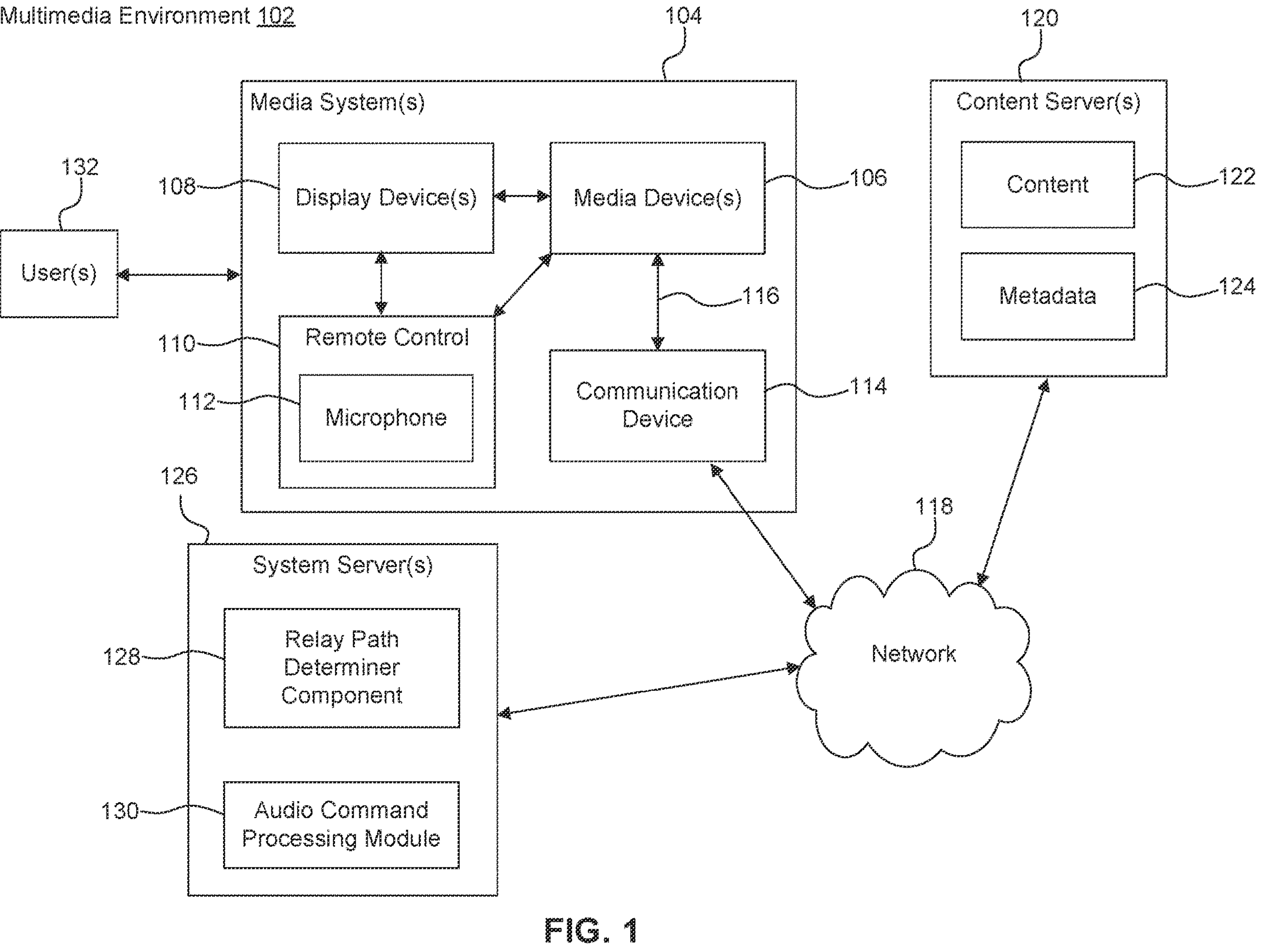
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

Figure 5:
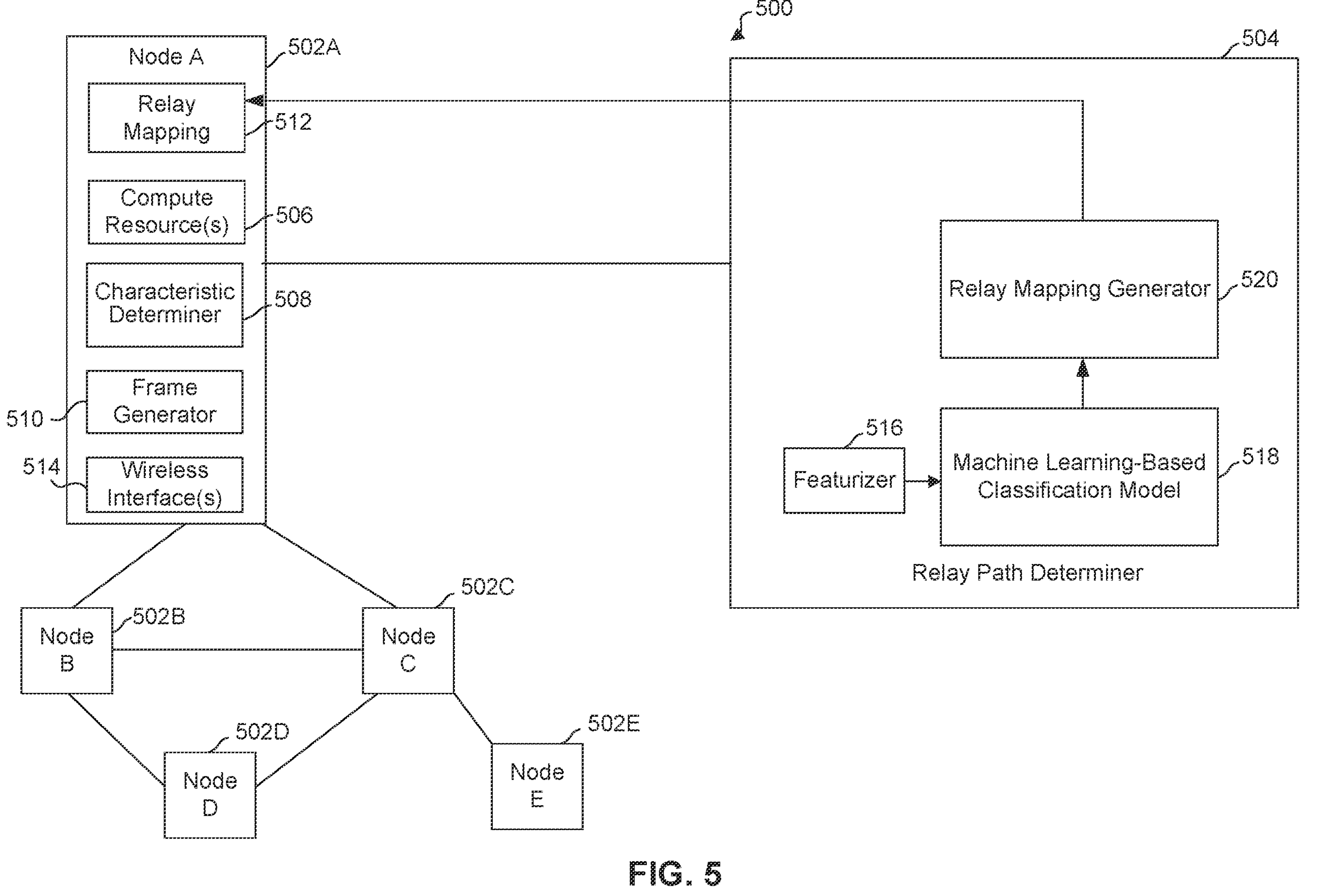
FIG. 5 is a block diagram of a system for determining a relay path for relaying data in a mesh network, according to some embodiments.

The system servers 126 may include a relay path determiner component 128. Relay path determiner component 128 may be configured to determine an optimal relay path utilized by media device(s) 106 for relaying data and to provide an indication of the optimal relay path to media device(s) 106 over network 118. Media device(s) 106 may relay data according to the indication. Additional details regarding relay path determiner component 128 are described below with respect to relay path determiner 504, as shown in FIG. 5.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
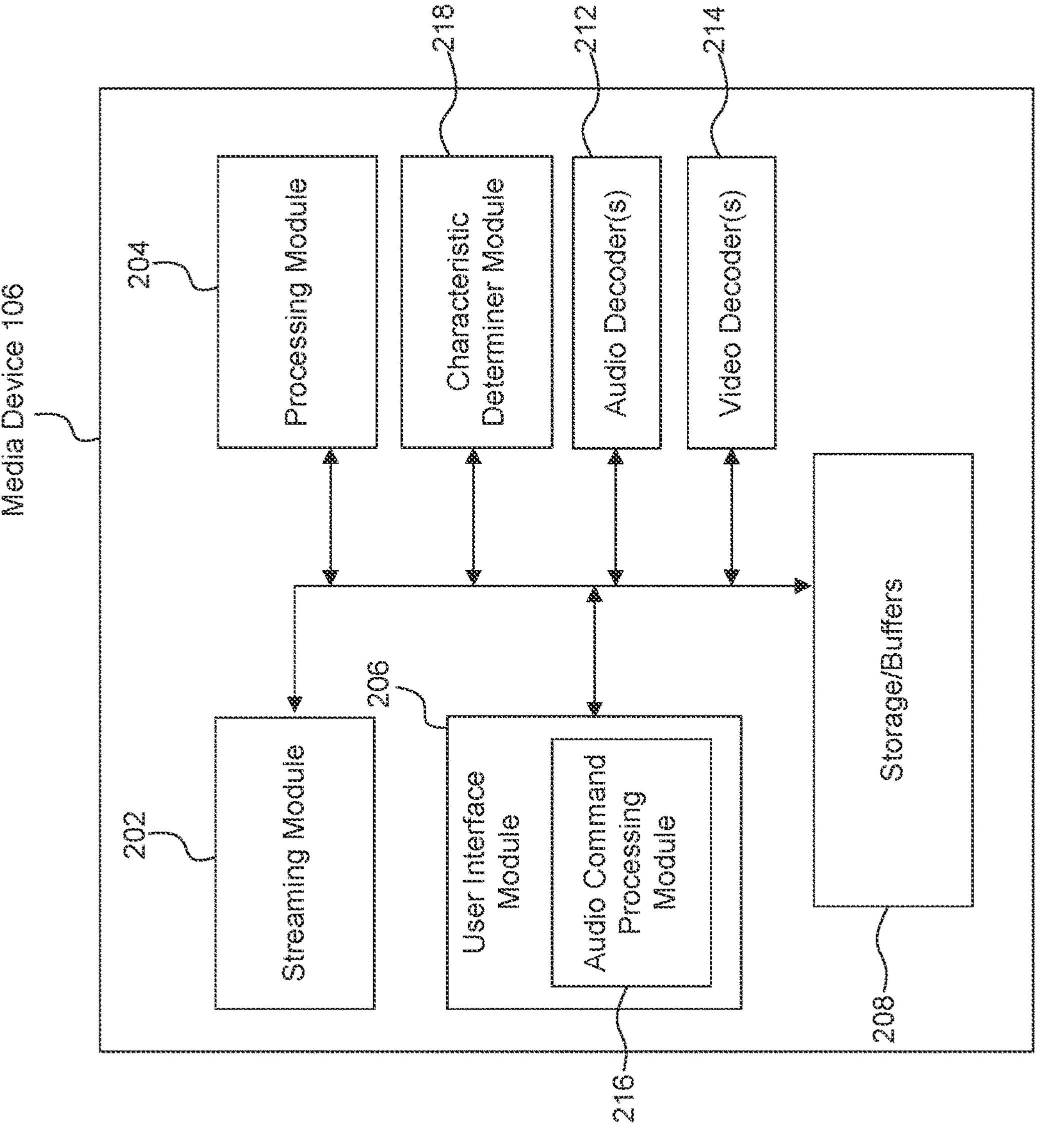
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Relaying Data in a Mesh Network Based on an Optimal Relay Path

As further shown in FIG. 2, media device 106 may include a characteristic determiner module 218. Characteristic determiner module 218 may be configured to determine various characteristics (e.g., signal characteristics, the throughput, and operational behavior) of media device 106 and other media device(s) communicatively coupled thereto. The determined characteristics may be provided to relay path determiner component 128 via network 118. As described herein, relay path determiner component 128 may determine an optimal relay path based on such characteristics and provide an indication of the determined relay path to media device 106. Additional details regarding characteristic determiner module 218 are described below with respect to characteristic determiner 508, as shown in FIG. 5.

Figure 3:
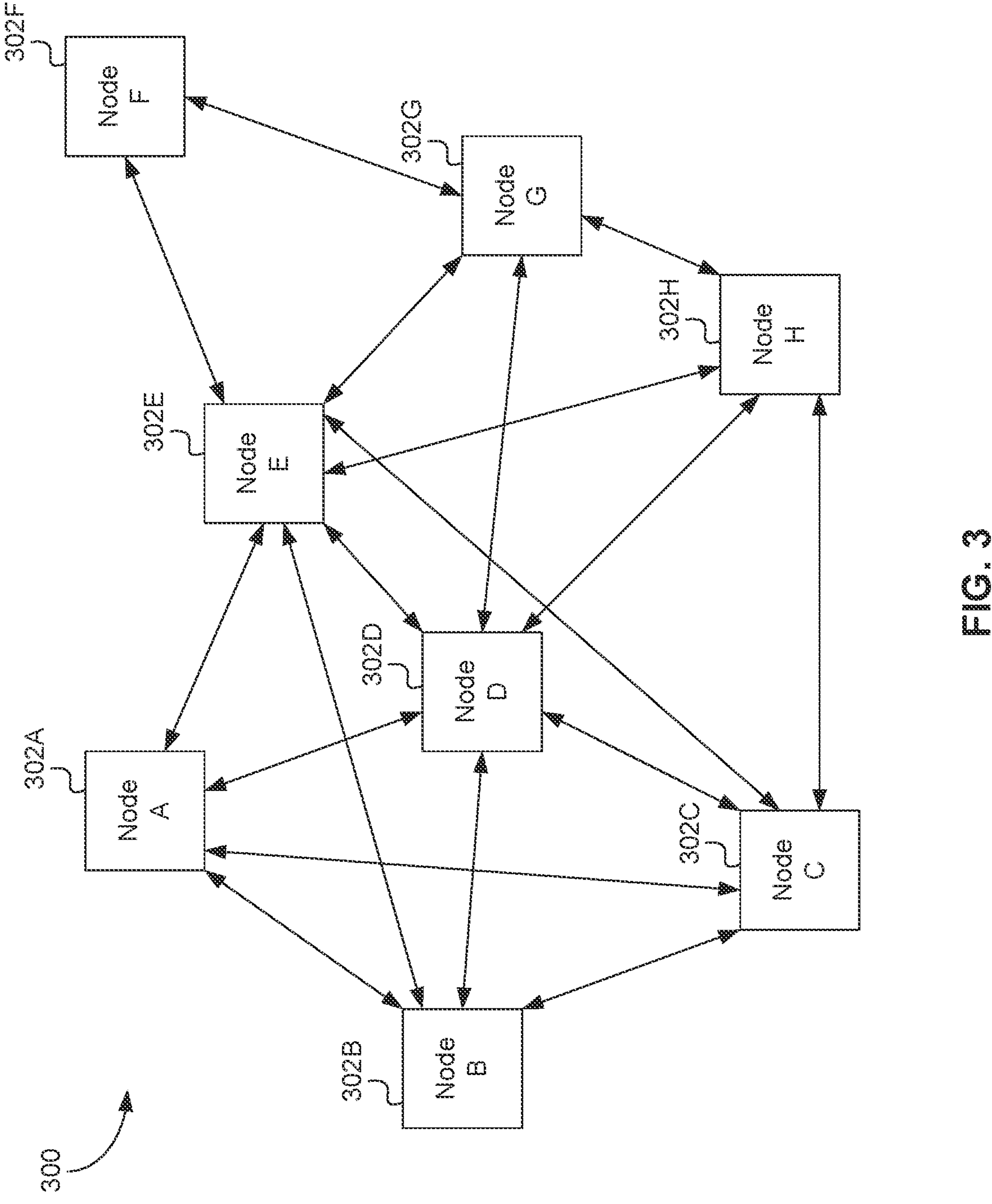
FIG. 3 illustrates a block diagram of a mesh network, according to some embodiments.

FIG. 3 illustrates a block diagram of a mesh network 300, according to some embodiments. As shown in FIG. 3, mesh network 300 may include a plurality of nodes 302A-302H. Each of the plurality of nodes 302A-302H may comprise a computing device, such as media device 106 or an IoT device. As used herein, the term "IoT device" is intended to broadly encompass any device that is capable of engaging in digital communication with another device. For example, a device that can digitally communicate with another device can comprise an IoT device, as that term is used herein, even if such communication does not occur over the Internet. Examples of an IoT device include, but are not limited to, a smart phone, a laptop computer, a notebook computer, a tablet computer, a netbook, a desktop computer, a video game console, a set-top box, or an over-the-top (OTT) streaming media player. Additional examples of an IoT device include so-called "smart home" devices, such as, but not limited to, a smart lightbulb, a smart switch, a smart outlet, a smart refrigerator, a smart washing machine, a smart dryer, a smart coffeemaker, a smart alarm clock, a smart smoke alarm, a smart carbon monoxide detector, a smart security sensor, a smart doorbell camera, a smart indoor or outdoor camera, a smart door lock, a smart thermostat, a smart plug, a smart television, a smart speaker, a smart remote controller, or a voice controller.

One or more nodes of nodes 302A-302H may be communicatively coupled to one or more other nodes of nodes 302A-302H via a mesh network topology. For example, in accordance with such an embodiment, node(s) of nodes 302A-302H may be linked directly to other node(s) of nodes 302A-302H such that they can communicate directly therewith without a router, a hub, an access point, and/or a connection to the Internet. For instance, as shown in FIG. 3, node 302A may communicate directly with node 302B, node 302C, node 302D, and 302E. Node 302B may communicate directly with node 302A, node 302C, node 302D, and node 302E. Node 302C may communicate directly with node 302A, node 302B, node 302D, node 302E, and node 302H. Node 302D may communicate directly with node 302A, node 302B, node 302C, node 302E, node 302G, and node 302H. Node 302E may communicate directly with node 302A, node 302B, node 302D, node 302F, node 302G, and node 302H. Node 302F may communicate directly with node 302E and node 302G. Node 302G may communicate directly with node 302B, node 302E, node 302F, and node 302H. Node 302H may communicate directly with node 302C, node 302D, node 302E, and node 302H.

Each of nodes 302A-302H may be assigned a unique identifier thereto. The identifier may be a media access control (MAC) address, which may be assigned to a node by a manufacturer thereof or via a setup procedure. Each of nodes 302A-302H may communicate directly with another node of nodes 302A-302H utilizing MAC frames. Each MAC frame may specify at least a first MAC address, a second MAC address, a third MAC address, and a payload. The first MAC address may identify a destination node for which the MAC frame is intended, the second MAC address may identify a source node that is sending the MAC frame, and the payload may comprise various information, including, but not limited to, control information, management information, and or data. To establish mesh network 300 without using a router, a hub, an access point, and/or a connection to the Internet, each of nodes 302A-302H may be configured to communicate directly with other node(s) of nodes 302A-302H utilizing MAC frames that are transmitted in accordance with a wireless communication protocol, such as Wi-Fi, and that are unassociated with a router, a hub, or access point. To unassociate the frames, each of node 302A-302H may be configured to transmit the frames that utilize locally administered MAC addresses and that do not specify a base service set (BSS) identifier (ID) associated with a router, a hub, or an access point, which is typically specified via the third MAC address. Instead, the third MAC address may comprise a group identifier corresponding to a group of nodes of nodes 302A-302H that are in communication with each other. MAC addresses may be specified to be locally administered during setup of mesh network 300, for example, by a user or network administrator. To indicate that a MAC address is locally administered, the universal/local (U/L) bit of the MAC addresses included in the MAC frame may be set to a value of 1. Similarly, the group identifier utilized for the third MAC address may also be specified during setup.

In some aspects, a node of nodes 302A-302H may indirectly communicate with another node of nodes 302A-302H via one or more relay paths comprising one or more nodes of nodes 302A-302H configured as relay node(s). For instance, as shown in FIG. 3, node 302A may indirectly communicate with node 302C via node 302B and/or node 302D. In this example, nodes 302B and/or 302D may be configured as relay nodes that relay data from node 302A to node 302C. In another example, node 302F may be configured to communicate with node 302C via nodes 302G and 302H, where node 302G is configured as a relay node to relay data from node 302F to node 302H, and node 302H is configured as a relay node to relay data from node 302G to 302C.

In the embodiment described with reference to FIG. 3, it is noted that mesh network 300 may operate without any connectivity to or reliance on a hub, an access point, or a router that is connected to a wide area network (WAN) or the Internet. One advantage to such an approach is that nodes 302A-320H of mesh network 300 are able to establish communication links with each other much more quickly, for example, in the event of power coming back on after a power outage. Conventional approaches require a hub, a router, and/or an access point to power on and establish an Internet connection before the mesh network is operable. This unnecessarily adds delay in using nodes of mesh network 300. A further advantage is attained in scenarios where nodes of mesh network 300 are battery-powered. In such a scenario, there is no usage disruption even during a power loss, as such nodes continue to operate as intended without a WAN or Internet connection.

Figure 4:
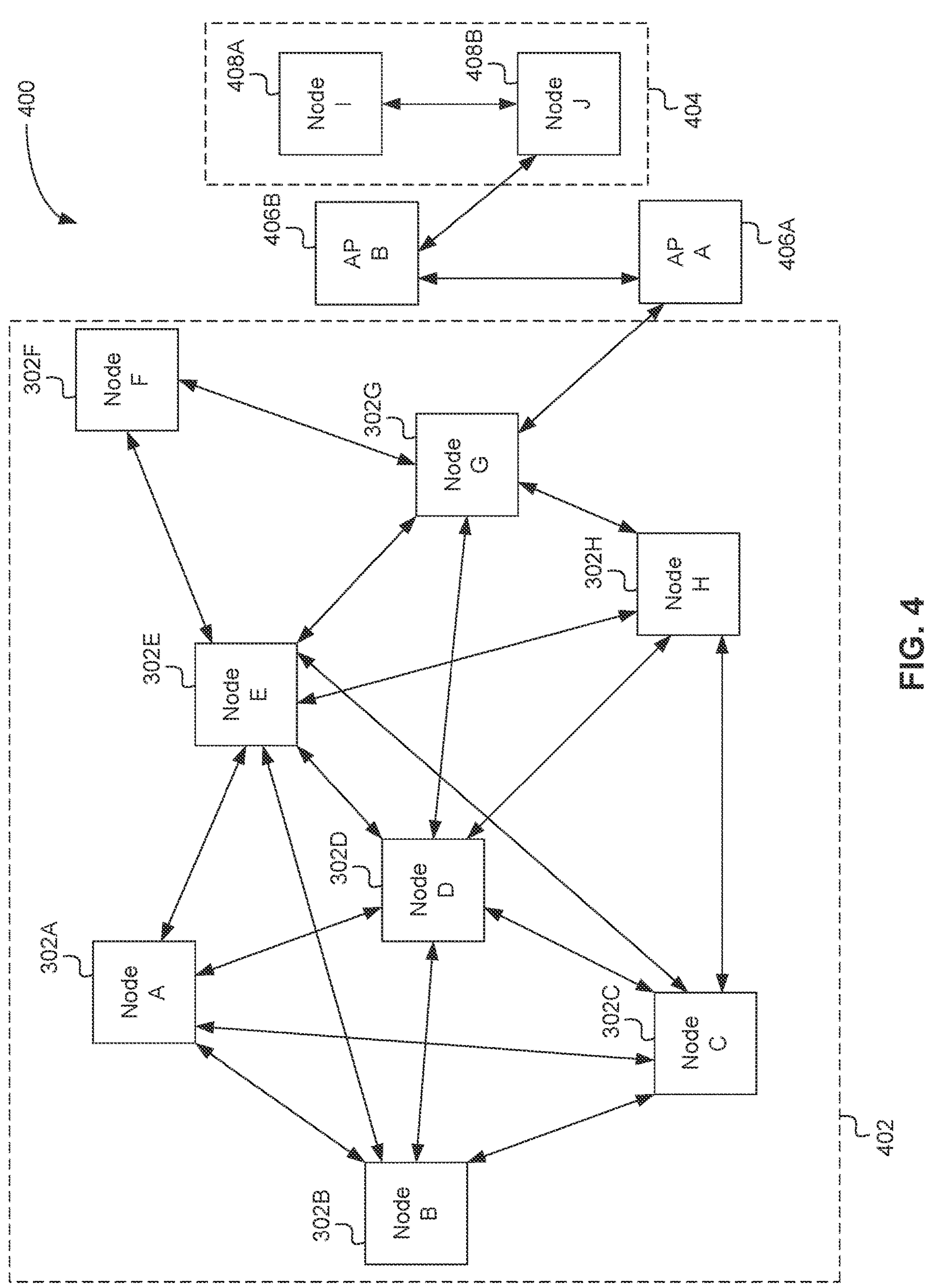
FIG. 4 a block diagram of a system comprising different mesh networks communicatively coupled to each other via access point(s), according to some embodiments.

In some aspects, one or more nodes of 302A-302H may be communicatively coupled to one or more access points or routers. Such access points may be communicatively coupled to other access point(s) or router(s) that are communicatively coupled to other nodes that comprise another mesh network. For example, FIG. 4 is a block diagram of a system 400 comprising different mesh networks communicatively coupled to each other via access point(s), according to some embodiments. As shown in FIG. 4, system 400 may include a first mesh network 402 comprising nodes 302A-302H and a second mesh network 404 comprising nodes 408A and 408B. Nodes 408A and 408B may be configured to communicate directly with each other in a similar manner as described above for nodes 302A-302H. Mesh network 402 may be located in a first premise, and mesh network 404 may be located in a second premise that is the same or different than the first premise. Examples of premises include, but are not limited to, a home, an office, a building, a factory, a warehouse, a bar, a restaurant, a movie theater, a stadium, an auditorium, a car, a bus, a boat, or any other structure, location or space in which nodes may be present.

In the example shown in FIG. 4, node 302G may be communicatively coupled to an access point 406A, node 408B may be communicatively coupled to an access point 406B, and access point 406A may be communicatively coupled to access point 406B. Access point 406A may be located in the same premise as mesh network 402, and access point 406B may located in the same premise as mesh network 404. In accordance with such a configuration, communications originating from node(s) of nodes 302A-302G of mesh network 402 may be relayed to node(s) of nodes 408A and 408B of mesh network 404 via access points 406A and 406B. To enable communication to access point 406A, node 302G may be configured to transmit MAC frames to access point 408A that are universally administered (e.g., by access point 406A) and that are associated with access point 406A (e.g., by specifying the BSS ID of access point 406A as the third MAC address of MAC frames transmitted thereby). Similarly, to enable communication to access point 406B, node 408B may be configured to transmit MAC frames to access point 406B that are universally administered (e.g., by access point 406B) and that are associated with access point 406B (e.g., by specifying the BSS ID of access point 406B as the third MAC address of MAC frames transmitted thereby).

It is noted that while system 400 utilizes an access point for each mesh network 402 and 404, the embodiments described herein are not so limited. For example, a single access point may be utilized that is communicatively coupled to node(s) of mesh network 402 and node(s) of mesh network 404. It is further noted that access point(s) utilized to communicatively couple multiple mesh networks may be located in a single premise or in multiple premises that may or may not be the same as the premise(s) in which the multiple mesh network are located so long as such access point(s) are within range of at least one node of each of the multiple mesh networks.

In some instances, one relay path may be more effective at relaying data than other relay paths depending on various factors, such as, placement of the relay nodes, the signal quality of signals transmitted and/or received thereby, etc. In accordance with embodiments described herein, an optimal relay path for relaying data between a source node and a destination node may be determined.

For example, FIG. 5 is a block diagram of a system 500 for determining a relay path for relaying data in a mesh network, according to some embodiments. As shown in FIG. 5, system 500 includes a plurality of nodes 502A-502E and a relay path determiner 504. Each of nodes 502A-502E may be examples of nodes 302A-302H, 408A, and 408B, as respectively described above with reference to FIGS. 3 and 4. As further shown in FIG. 5, node 502A may include one or more compute resource(s) 506, a characteristic determiner 508, a frame generator 510, a relay mapping 512, and one or more wireless interfaces 514.

Compute resource(s) 506 may include one or more hardware components (e.g., processor(s), main memory, secondary memory (e.g., hard disk drives, removable storage devices, etc.), network interfaces (e.g., wireless interface(s)

514), etc. Additional details regarding such hardware components are described in detail below in reference to FIG. 10.

Wireless interface(s) 514 may comprise components suitable for enabling node 502A to wirelessly communicate with other devices via a corresponding wireless protocol. Wireless interface(s) 332 may include, for example and without limitation, one or more of: a Wi-Fi interface that enables node 502A to wirelessly communicate with another node, an access point, or other remote Wi-Fi-capable device according to one or more of the wireless network protocols based on the IEEE (Institute of Electrical and Electronics Engineers) 802.11 family of standards, a cellular interface that enables node 502A to wirelessly communicate with remote devices via one or more cellular networks, a Bluetooth interface that enables node 502A to engage in short-range wireless communication with other Bluetooth-enabled devices, or a Zigbee interface that enables node 502A to wirelessly communicate with other Zigbee-enabled devices.

Frame generator 510 may be configured to generate various types of MAC frames. The MAC frames may be low-level frames (e.g., frames generated and transmitted via the MAC layer and not an Internet Protocol (IP) layer). For example, frame generator 510 may be configured to generate beacon MAC frames (also referred herein as beacon signals). Each beacon signal may be generated periodically or may be generated in response to a particular event (e.g., a change in power state or operation of node 502A). The beacon signal may uniquely identify node 502A and may be broadcasted to a plurality of other nodes (e.g., nodes 502B-502E). The beacon signal may be utilized by other nodes to discover node 502A and/or to determine whether node 502A is operating. The beacon signal may also comprise data that indicates one or more particular states (e.g., a power state, an operational state, etc.) of node 502A.

FIG. 6A is a block diagram of beacon MAC frame 600, according to some embodiments. As shown in FIG. 6A, beacon MAC frame 600 may comprise various fields, including, but not limited to, a two-byte frame control field 602, a two-byte duration field 604, a six-byte first MAC address field 606, a six-byte second MAC address field 608, a six-byte third MAC address field 610, a two-byte sequence control field 612, a variable-byte payload field 614, and a four-byte frame check sequence field 616.

Frame control field 602 may indicate the type of frame and various control information. Beacon MAC frame 600 may be an action frame type because beacon MAC frame 600 is unassociated with an access point. An action frame is a type of management frame used to trigger a particular action (e.g., to discover node 502A, to determine whether node 502A is operating, to determine particular state(s) of node 502A, etc.). Duration field 604 may comprise a value indicating the period of time in which the channel or medium via which beacon MAC frame 600 is transmitted is occupied. First address field 606 may specify a broadcast address (e.g., a repeating sequence of hexadecimal value F). Nodes receiving beacon MAC frame 600 including such a broadcast address may determine that such a frame is broadcasted and intended for a plurality of nodes. Second address field 608 may specify the source node (e.g., node 502A) that is transmitting beacon MAC frame 600. Third address field 610 may specify a particular MAC address, which indicates that beacon MAC frame 600 is part of a mesh network. For example, prior to node setup, the MAC address included in third address field 610 may use a default MAC address with the U/L bit being set to indicate that the default MAC address is locally administered. After node setup, the MAC address included in third address field 610 may be unique to the node within the mesh network (with the U/L bit being set to indicate that the MAC address is locally administered). This enables nodes receiving such a beacon MAC frame to filter out neighboring devices that are not part of the mesh network. For nodes that are part of a group (e.g., a set of smart light bulbs included in a particular room), the MAC address included in third address field 610 may specify a group identifier corresponding to a plurality of nodes included in the group. Sequence control field 612 may comprise a sequence and/or fragment number associated with beacon MAC frame 600. In an embodiment, the value stored in sequence control field 612 may be 0 and may be set by a driver (e.g., a Wi-Fi driver) of the node transmitting beacon MAC frame 600. Payload field 614 may comprise a payload comprising various types of information, including, but not limited to, control information, management information, and or data (e.g., information indicative of the power or operational state or behavior of the node transmitting beacon MAC frame 600). The payload may be structured using type-length-value (TLV) field encoding, which allows for forward and backward compatibility. Frame check sequence field 616 may comprise an error-detecting code that is calculated by the transmitting node based on the data in beacon MAC frame 600. When a destination node receives beacon MAC frame 600, the error-detecting code is recalculated and compared with the error-detecting code included in beacon MAC frame 600. If the two error-detecting codes are different, an error in the received beacon MAC frame may be assumed, and the frame may be discarded.

Another type of MAC frame that may be generated by frame generator 510 is a group broadcast frame. A group broadcast frame may be configured to simultaneously deliver commands and/or any other types of data to a group of nodes. For example, multiple lights in a particular room may be part of a group addressed by a single group broadcast frame. The format of a group broadcast frame may be the same as beacon MAC frame 600, except the MAC address included in third address field 610 may include a group identifier corresponding to a plurality of nodes included in the group (with the U/L bit being set to indicate that the MAC address is locally administered).

A further type of MAC frame that may be generated by frame generator 510 is a unicast MAC frame. A unicast MAC frame may reliably delivered to a specific destination MAC address. Such frames may be acknowledged by a receiving node via a PHY-ACK protocol. When a unicast frame is lost or corrupted, the transmission of the unicast frame may be automatically retried by the transmitting node. An exemplary format of a unicast MAC frame is shown in FIG. 6B, which depicts a block diagram of a unicast MAC frame 615. As shown in FIG. 6B, the format of unicast MAC frame 615 is similar to beacon MAC frame 600, except for the MAC address stored in first address field 606. As shown in FIG. 6B, first address field 606 may include a destination MAC address that uniquely identifies the single node for which unicast MAC frame 615 is intended.

Referring again to FIG. 5, characteristic determiner 508 may be an example of characteristic determiner module 218, as described above with reference to FIG. 2. Characteristic determiner 508 may be configured to determine various characteristics associated with node 502A. For example, characteristic determiner 508 may be configured to profile compute resource(s) 506 to determine a throughput (e.g., how busy a particular compute resource is) of node 502A (e.g., with respect to request rates, memory allocation levels, a number of processing cycles, etc.), hourly/daily statistics (mean, maximum, minimum, standard deviation, jitter, skew, kurtosis, etc.) and/or patterns with respect to network usage, processing usage, memory usage, etc. Such metrics may be collected at regular intervals (e.g., each second, each minute, each hour, each day, etc.). Characteristic determiner 508 may also be configured to perform a beacon survey with respect to the other nodes communicatively coupled to node 502A to determine various network-related characteristics. For example, characteristic determiner 508 may determine a modulation coding scheme (MCS) utilized by node 502A, a received signal strength for node 502A based on beacon MAC frames received thereby, a signal-to-noise ratio for beacon MAC frames received by node 502A, an error rate and/or loss frequency based on beacon MAC frames received by node 502A, etc. Characteristic determiner 508 may also determine a periodicity at which a beacon MAC frame is received (e.g., whether a beacon MAC frame is received hourly, daily, weekly, etc.). Based on the foregoing characteristics, characteristic determiner 508 may also determine characteristics of other nodes communicatively coupled thereto, such as, but not limited to, an operational behavior of such nodes (e.g., whether a node is powered on, or powered off, or performing a particular operation, or a pattern of usage indicating when (e.g., times and/or days) the node is powered on, powered off, or performing a particular operation). Characteristic determiner 508 may also determine other characteristics of nodes based on beacon surveying, including, but not limited, an identifier (e.g., a MAC address) associated with each node that is included in the beacon signal, information included in a beacon signal that identifies a function of a node, whether a node is battery powered or powered via a wall outlet, etc. Characteristic determiner 508 may provide an indications or representations of one or more of the foregoing characteristics (e.g., via a MAC frame) to relay path determiner 504 via wireless interface(s) 514.

Each of nodes 502B-502E may include similar components to those shown with respect to node 502A. Thus, for example, each of nodes 502B-502E may include compute resource(s), a characteristic determiner, a frame generator, wireless interface(s), and a relay mapping (as described below).

Relay path determiner 504 may be an example of relay path determiner component 128, as described above with reference to FIG. 1. Relay path determiner 504 may comprise a featurizer 516, a machine learning-based classification model 518, and a relay mapping generator 520. Featurizer 516 may be configured to receive the indications of the characteristics provided by characteristic determiner 508 and generate one or more feature vectors representative of the characteristics. The feature vector(s) generated by featurizer 516 may take any form, such as a numerical, visual and/or textual representation, or may comprise any other suitable form. Featurizer 516 may operate in a number of ways to featurize, or generate feature vector(s) for characteristics obtained from characteristic determiner 508. For example and without limitation, featurizer 516 may featurize the indications through time series analysis, keyword featurization, semantic-based featurization, digit count featurization, and/or n-gram-TFIDF featurization. The feature vector(s) are provided to machine learning-based classification model 518.

Machine learning-based classification model 518 may be configured to generate one or more classifications based on the feature vector(s) provided thereto. Each of the classification(s) is indicative of a particular relay path for relaying data from a source node from nodes 502A-502E to a destination node of nodes 502A-502E. For example, each of the classification(s) may be associated with a value (or score) between 0.0 and 1.0, where higher the number, the more optimal a relay path for the source node and destination node. Machine learning-based classification model 518 may generate respective classification(s) for each source node-destination pair in the mesh network. It is noted that the score values described herein are purely exemplary and that other score values may be utilized. Each relay path determined by machine learning-based classification model 518 may comprise an identifier of the source node, identifier(s) of one or more relay nodes, and an identifier of the destination node. An example of such identifiers are the MAC addresses of such nodes. One or more relay paths determined for each node of nodes 502A-502E may be provided to relay mapping generator 520. For example, the top N relay paths may be provided to relay mapping generator 520, where N is a positive integer.

Machine learning-based classification model 518 may be trained to generate classification(s) based on a historical set of characteristics (as described above with reference to characteristic determiner 508) obtained for nodes included in a plurality of different mesh networks. Such characteristics may be obtained over the course of several days, weeks, months, or years). Such characteristics may be inputted as feature vectors to a machine learning algorithm (e.g., a supervised machine learning algorithm), which learns the type of characteristics that are ideal for an optimal relay path based on the feature vectors.

Relay mapping generator 520 may be configured to generate one or more relay mappings for each node of node(s) 502A-502E. For example, for a given node in a particular relay path, relay mapping generator 520 may map a first identifier of a first node in the relay path from which the given node receives data (e.g., via a MAC frame) to a second identifier of a second node in the relay path to which the received data is to be transmitted. Relay mapping generator 520 may generate more than one mapping for a given node. The additional mapping(s) may serve as alternate relay paths in the event that a node in the relay path is no longer available for relaying (e.g., due to being powered off, due to experiencing significant signal interference, etc.).

Each mapping may be ranked in accordance to the values of the classifications generated by machine learning-based classification model 518. In one embodiment, the relay mappings generated for a particular node may be provided to that node by relay mapping generator 520 and stored as a relay mapping 512. In another embodiment, the relay mappings generated for a particular node may be provided to a different node in the mesh network, and that different node may forward that mapping to the node for which the relay mappings are intended.

For example, suppose a determined relay path comprises node 502A, node 502B, and node 502D, where node 502A is the source node, node 502B is a relay node, and node 502D is the destination node. In this example, node 502B may receive and store a first relay mapping 512 that maps the identifier of node 502A to the identifier of node 502D. Using the mapping, node 502B forwards data received from node 502A to node 502D.

Relay path determiner 504 may be implemented by a device (e.g., a server) that is remote from the premise in which nodes 502A-502E are located but communicatively connected to at least one of nodes 502A-502E via an access point. In such an implementation, the relay mappings generated for all the nodes in the mesh network may be provided to the at least one node, and the at least one node communicates the mappings to other nodes in the mesh network. Alternatively, relay path determiner 504 may be implemented by a device within the premise in which nodes 502A-502E are located, such as by one or more of nodes 502A-502E.

Figure 7:
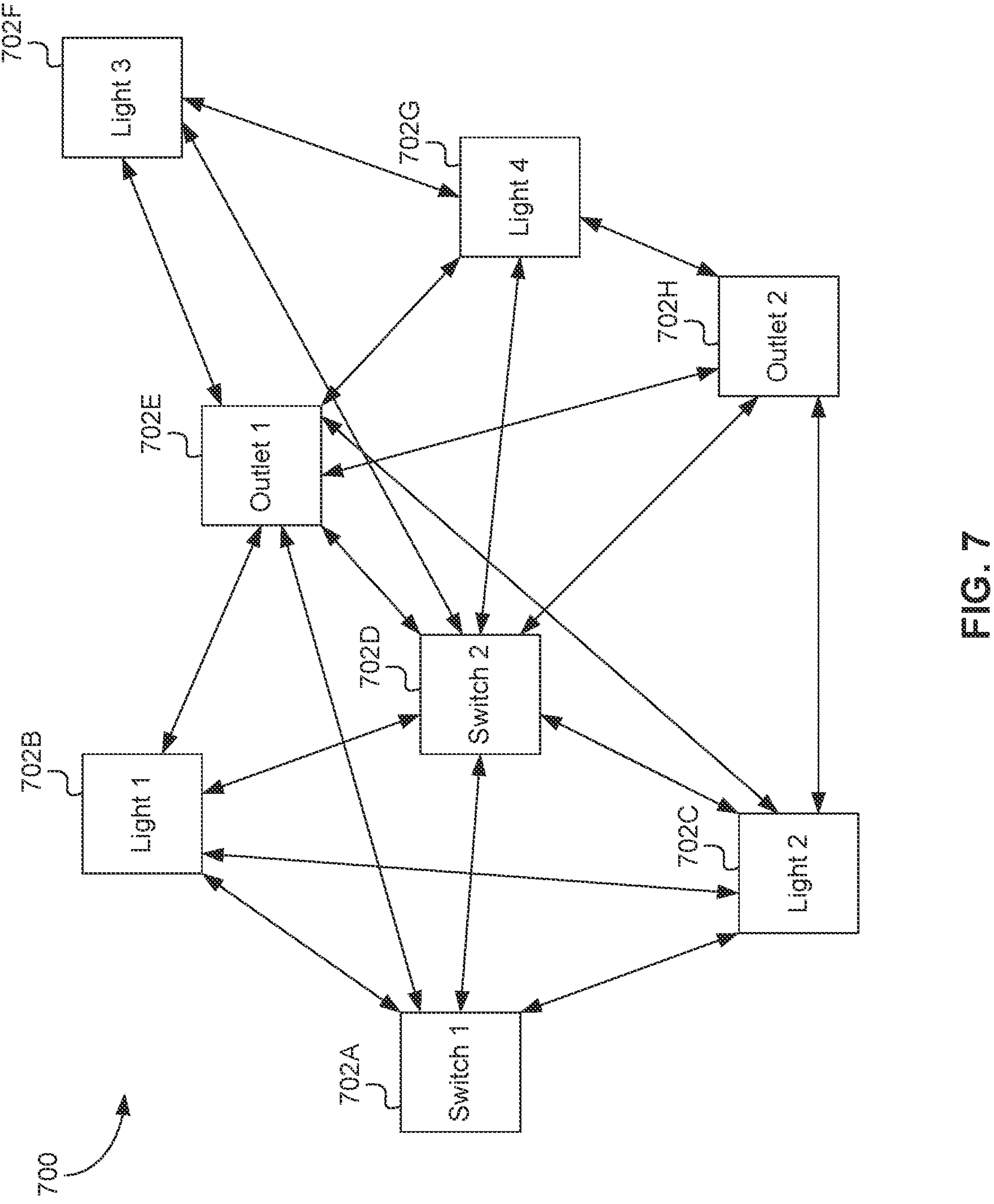
FIG. 7 illustrates a block diagram of a mesh network configured to relay frames between various smart devices, according to some embodiments.

FIG. 7 illustrates a block diagram of a mesh network 700 configured to relay frames between various smart devices, according to some embodiments. As shown in FIG. 7, mesh network 700 may include a plurality of nodes 702A-702H. In the example shown in FIG. 7, node 702A is a first smart switch, node 702B is a first smart light bulb, node 702C is a second smart light bulb, node 702D is a second smart switch, node 702E is a first smart outlet, node 702F is a third smart light bulb, node 702G is a fourth smart light bulb, and node 702H is a second smart outlet. The smart lights bulbs corresponding to nodes 702B and 702C, the second smart switch corresponding to node 702D and/or the first smart outlet corresponding to node 702E may be within range of the smart switch corresponding to node 702A, and thus, node 702A may discover nodes 702B, 702C, 702D, and/or 702E via beacon signals transmitted by nodes 702B, 702C, 702D, and/or 702E. However, the smart light bulbs corresponding to nodes 702F and 702G may not be within range of the first smart switch corresponding to node 702A, and therefore, node 702A is unable to detect beacon signals transmitted by nodes 702F and 702G. The first smart switch corresponding to node 702A may communicate directly with the smart light bulbs corresponding to nodes 702B and 702C to activate (e.g., power on) or deactivate (e.g., power off) such smart light bulbs. The first smart switch corresponding to node 702A and the smart light bulbs corresponding to nodes 702B and 702C may be located in a first room (e.g., a living room).

Similarly, the smart lights bulbs corresponding to node 702F and 702G may be within range of the smart switch corresponding to node 702D, and thus, node 702D may discover nodes 702F and 702G via beacon signals transmitted by nodes 702F and 702G. The second smart switch corresponding to node 702D may communicate directly with the smart light bulbs corresponding to nodes 702F and 702G to activate or deactivate such smart light bulbs. The second smart switch corresponding to node 702D and the smart light bulbs corresponding to nodes 702F and 702G may be located in a second room (e.g., a kitchen).

A user may desire to control all four smart light bulbs corresponding to nodes 702B, 702C, 702F, and 702G via the first smart switch corresponding to node 702A. Accordingly, all four smart light bulbs would have to receive the command transmitted by the first smart switch. Because the smart light bulbs corresponding nodes 702F and 702G are out of range, the command from the first light switch may be relayed via another node, such as the second smart switch corresponding to node 702D and/or the first smart outlet corresponding to node 702E.

Relay path determiner 504 may determine an optimal relay path for relaying commands from the first smart switch corresponding to node 702A and the third and fourth smart light bulbs corresponding to nodes 702F and 702G based on characteristics of node(s) of nodes 702A-702H collected via characteristic determiner 508, as described above with reference to FIG. 5. In an example, relay path determiner 504 may determine that the most optimal relay path is via the second smart switch corresponding to node 702D. Accordingly, relay path determiner 504 may provide a relay mapping (e.g., relay mapping 512) to the node 702D which indicates that commands received from the first smart switch corresponding to node 702A are to be relayed to the third and fourth smart light bulbs corresponding to nodes 702F and 702G. For instance, the relay mapping may map a first identifier (e.g., a MAC address) of the first smart switch to a second identifier of the third smart light bulb and a third identifier of the fourth smart light bulb.

Figure 8:
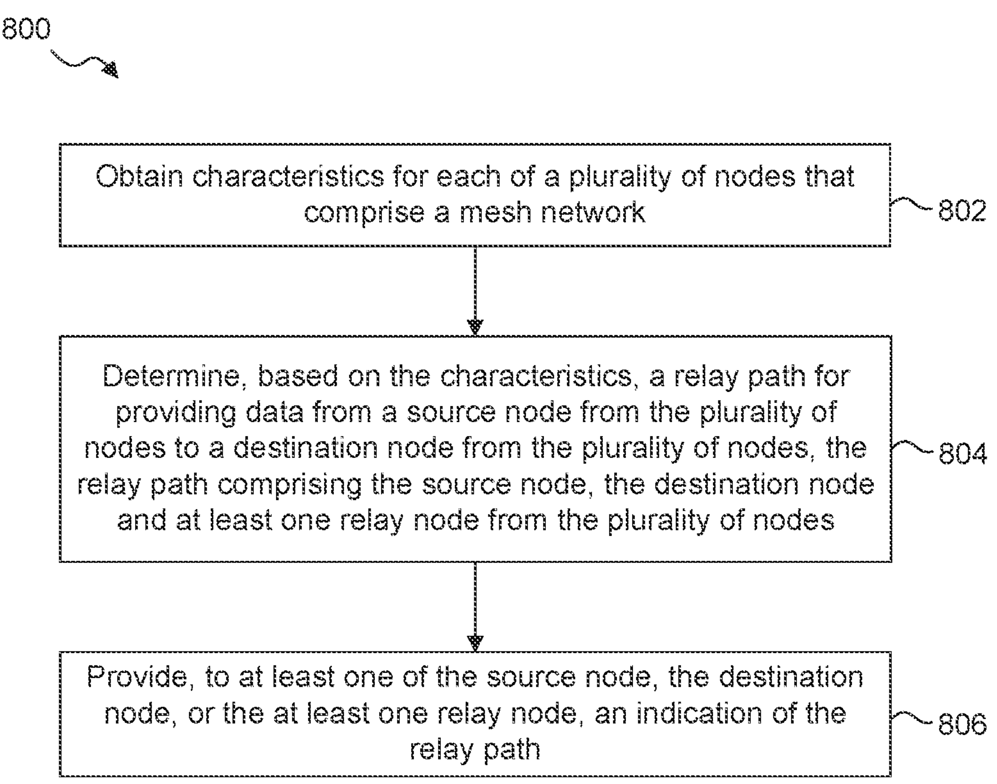
FIG. 8 is a flowchart for a method for providing an indication of a relay path in a mesh network, according to an embodiment.

FIG. 8 is a flowchart for a method 800 for providing an indication of a relay path in a mesh network, according to an embodiment. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to relay path determiner 504 of FIG. 5, which is one example of a relay path determiner. However, method 800 is not limited to that example embodiment.

In 802, featurizer 516 may obtain characteristics for each of a plurality of nodes (e.g., nodes 502A-502E) that comprise a mesh network. For example, as discussed herein, characteristic determiner 508 from node(s) of nodes 502A-502E may determine characteristics associated therewith and provide such characteristics to featurizer 516 via wireless interface(s) 514. The characteristics obtained by featurizer 516 may comprise at least one of (i) a throughput for each of the plurality of nodes, (ii) for each node of the plurality of nodes, a received signal strength with respect to one or more other nodes in the plurality of nodes, (iii) for each node of the plurality of nodes, a signal-to-noise ratio with respect to the one or more other nodes in the plurality of nodes, (iv) an MCS utilized by each of the plurality of nodes, (v) an indication of operational behavior for each of the plurality of nodes, and/or (vi) for each node of the plurality of nodes, an indication of a periodicity at which a beacon signal (e.g., a beacon MAC frame) is received from at least one other node of the plurality of nodes.

In 804, machine learning-based classification model 518 may determine, based on the characteristics, a relay path for providing data from a source node (e.g., node 502A) from the plurality of nodes to a destination node (e.g., node 502E) from the plurality of nodes, the relay path comprising the source node, the destination node and at least one relay node (e.g., node(s) 502B, 502C, and/or 502D) from the plurality of nodes. For example, as discussed herein, at least one of the source node, the destination node, or the at least one relay node may comprise at least one of an IoT device, a television, a sound bar, a computing device, an appliance, or a smart phone.

In 806, relay mapping generator 520 may provide, to at least one of the source node, the destination node, or the at least one relay node, an indication of the relay path (e.g., relay mapping 512). For example, as discussed herein, the indication of the relay path may comprise at least one a first identifier (e.g., a MAC address) of a first node from the plurality of nodes in the relay path from which the at least one relay node receives the data or a second identifier (e.g., a MAC address) of a second node from the plurality of nodes in the relay path to which the data is to be transmitted by at the least one relay node.

In some aspects, the at least one relay node is configured to transmit and receive the data via a Wi-Fi-based communication protocol and is unassociated with an access point.

For instance, MAC frames in which the data is transmitted may be locally-administered and may not specify a BSS ID of an access point.

In some aspects, the at least one relay node comprises a first access point and a second access point communicatively coupled via the Internet. For example, as shown in FIG. 4, the at least one relay node may be access point 406A that is communicatively coupled to access point 406B. This way, data may be relayed from one mesh network to another mesh network via the access points 406A and 406B.

Figure 9:
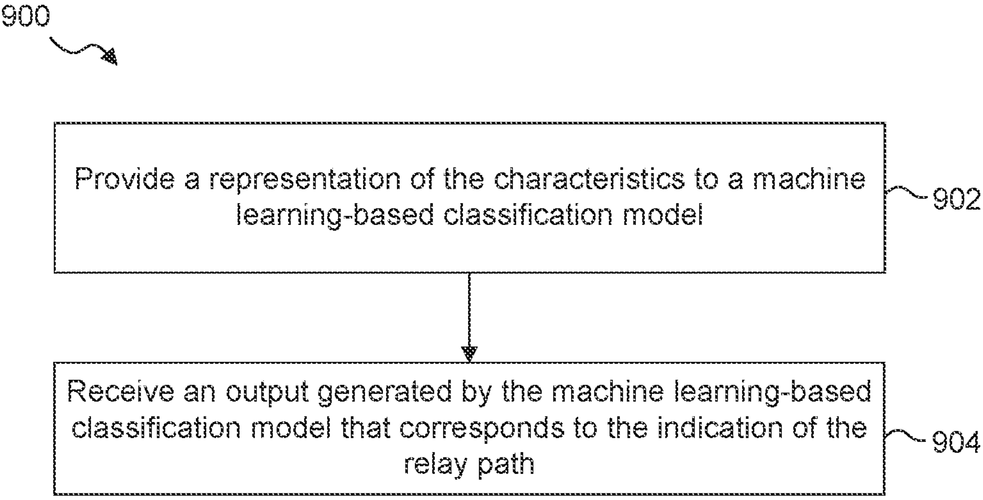
FIG. 9 is a flowchart for a method for determining a relay path in a mesh network, according to an embodiment.

FIG. 9 is a flowchart for a method 900 for determining a relay path in a mesh network, according to an embodiment. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to relay path determiner 504 of FIG. 5, which is one example of a relay path determiner. However, method 900 is not limited to that example embodiment.

In 902, featurizer 516 may provide a representation of the characteristics (e.g., (e.g., feature vector(s)) to machine learning-based classification model 518.

In 904, relay mapping generator 520 may receive an output generated by machine learning-based classification model 518 that corresponds to the indication of the relay path (e.g., relay mapping 512).

Example Computer System

Figure 10:
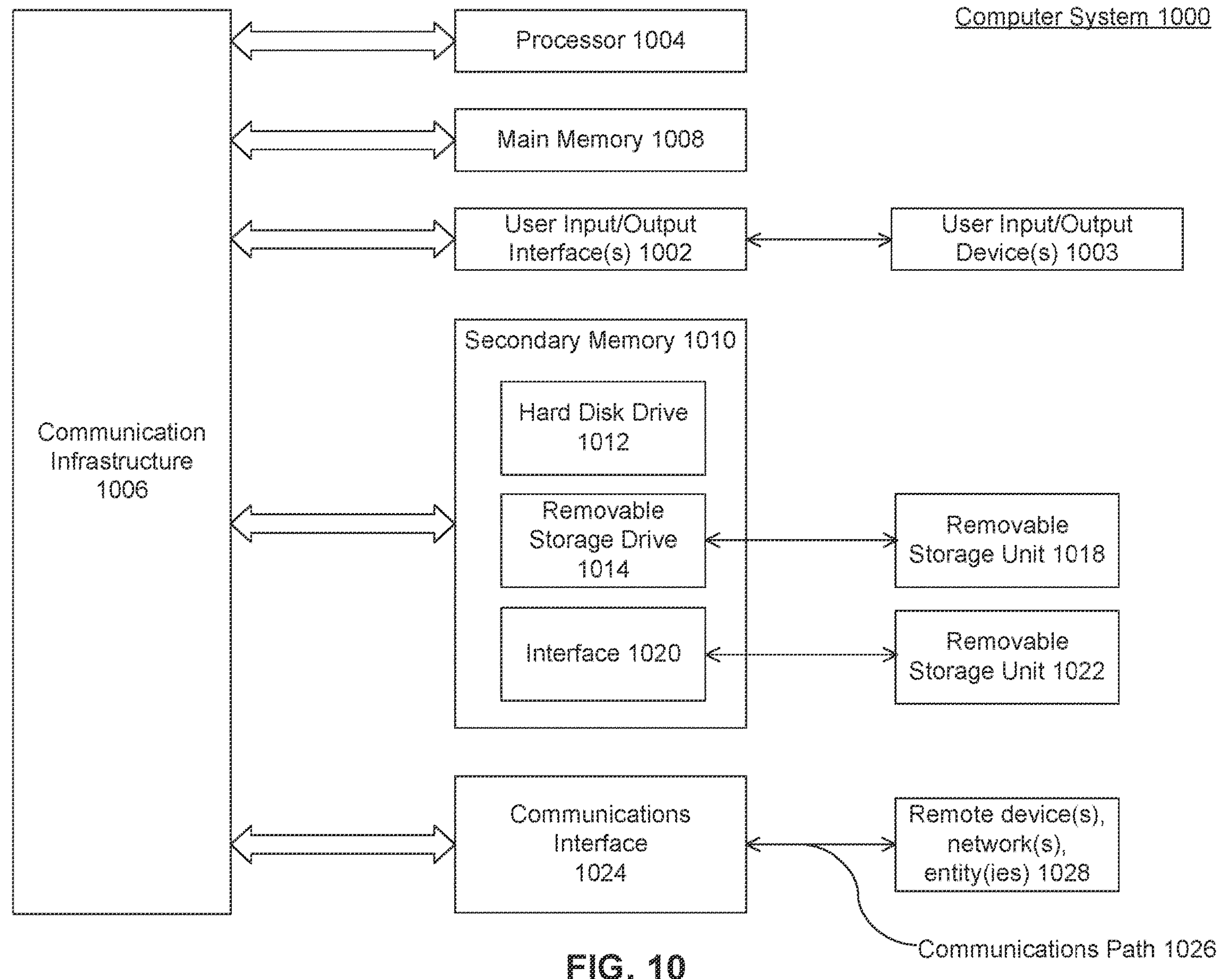
FIG. 10 illustrates an example computer system useful for implementing various embodiments.

Various embodiments may be implemented, for example, using one or more well-known computer systems, such as computer system 1000 shown in FIG. 10. For example, one or more of media device 106, remote control 110, content server(s) 120, system server(s) 126, relay path determiner component 128, characteristic determiner module 218, nodes 302A-302H, access points 406A and 406B, nodes 408A and 408B, nodes 502A~502E, characteristic determiner 508, frame generator 510, wireless interface(s) 514, relay path determiner 504, featurizer 516, machine learning-based classification model 518, relay mapping generator 520, relay mapping 512, and nodes 702A-702H may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

receiving, by a server and from one of a plurality of nodes that comprise a mesh network, characteristics for each of the plurality of nodes;

determining, by the server and based on the characteristics, a relay path for providing data from a source node from the plurality of nodes to a destination node from the plurality of nodes, the relay path comprising the source node, the destination node and at least one relay node from the plurality of nodes, wherein:

the at least one relay node is configured to transmit and receive the data via a Wi-Fi-based communication protocol using unassociated media access control (MAC) frames that utilize locally administered MAC addresses, and a MAC address field of the unassociated MAC frames comprises a group identifier corresponding to a group of the nodes without specifying a base service set identifier (BSS-ID); and providing, by the server, an indication of the relay path to at least one of the source node, the destination node, or the at least one relay node.

2. The computer-implemented method of claim 1, further comprising performing a Wi-Fi beacon survey to receive the characteristics, wherein the characteristics comprise a periodicity at which data via Wi-Fi-based beacon MAC frames are received by the at least one relay node while unassociated with an access point.

3. The computer-implemented method of claim 1, wherein at least one of the source node, the destination node, or the at least one relay node comprises at least one of:

an Internet-of-Things (IoT) device;

a television;

a sound bar;

a computing device;

an appliance; or a smart phone.

4. The computer-implemented method of claim 1, wherein determining the relay path comprises:

providing a representation of the characteristics to a machine learning-based classification model; and receiving an output generated by the machine learning-based classification model that corresponds to the indication of the relay path.

5. The computer-implemented method of claim 1, wherein the characteristics comprise at least one of:

a throughput for each of the plurality of nodes;

for each node of the plurality of nodes, a received signal strength with respect to one or more other nodes in the plurality of nodes;

for each node of the plurality of nodes, a signal-to-noise ratio with respect to the one or more other nodes in the plurality of nodes;

a modulation coding scheme utilized by each of the plurality of nodes;

an indication of operational behavior for each of the plurality of nodes; or for each node of the plurality of nodes, an indication of a periodicity at which a beacon signal is received from at least one other node of the plurality of nodes.

6. The computer-implemented method of claim 1, wherein the at least one relay node comprises a first access point and a second access point communicatively coupled via the Internet.

7. The computer-implemented method of claim 1, wherein the indication of the relay path comprises at least one of:

a first identifier of a first node from the plurality of nodes in the relay path from which the at least one relay node receives the data; or a second identifier of a second node from the plurality of nodes in the relay path to which the data is to be transmitted by the at least one relay node.

8. A system for relaying data in a mesh network, comprising:

one or more memories; and at least one processor each coupled to at least one of the one or more memories and configured to perform operations comprising:

receiving, by a server and from one of a plurality of nodes that comprise the mesh network, characteristics for each of the plurality of nodes;

determining, by the server and based on the characteristics, a relay path for providing data from a source node from the plurality of nodes to a destination node from the plurality of nodes, the relay path comprising the source node, the destination node and at least one relay node from the plurality of nodes, wherein:

the at least one relay node is configured to transmit and receive the data via a Wi-Fi-based communication protocol using unassociated media access control (MAC) frames that utilize locally administered MAC addresses, and a MAC address field of the unassociated MAC frames comprises a group identifier corresponding to a group of the nodes without specifying a base service set identifier (BSS-ID); and providing, by the server, an indication of the relay path to at least one of the source node, the destination node, or the at least one relay node.

9. The system of claim 8, wherein;

the operations further comprise performing a Wi-Fi beacon survey to receive the characteristics, and the characteristics comprise a periodicity at which data via Wi-Fi-based beacon MAC frames are received by the at least one relay node while unassociated with an access point.

10. The system of claim 8, wherein at least one of the source node, the destination node, or the at least one relay node comprises at least one of:

an Internet-of-Things (IoT) device;

a television;

a sound bar;

a computing device;

an appliance; or a smart phone.

11. The system of claim 8, wherein determining the relay path comprises:

providing a representation of the characteristics to a machine learning-based classification model; and receiving an output generated by the machine learning-based classification model that corresponds to the indication of the relay path.

12. The system of claim 8, wherein the characteristics comprise at least one of:

a throughput for each of the plurality of nodes;

for each node of the plurality of nodes, a received signal strength with respect to one or more other nodes in the plurality of nodes;

for each node of the plurality of nodes, a signal-to-noise ratio with respect to the one or more other nodes in the plurality of nodes;

a modulation coding scheme utilized by each of the plurality of nodes;

an indication of operational behavior for each of the plurality of nodes; or for each node of the plurality of nodes, an indication of a periodicity at which a beacon signal is received from at least one other node of the plurality of nodes.

13. The system of claim 8, wherein the at least one relay node comprises a first access point and a second access point communicatively coupled via the Internet.

14. The system of claim 8, wherein the indication of the relay path comprises at least one of:

a first identifier of a first node from the plurality of nodes in the relay path from which the at least one relay node receives the data; or a second identifier of a second node from the plurality of nodes in the relay path to which the data is to be transmitted by the at least one relay node.

15. A non-transitory computer-readable medium having instructions stored thereon that, when executed by at least one computing device, cause the at least one computing device to perform operations comprising:

receiving, by a server and from one of a plurality of nodes that comprise a mesh network, characteristics for each of the plurality of nodes;

determining, by the server and based on the characteristics, a relay path for providing data from a source node from the plurality of nodes to a destination node from the plurality of nodes, the relay path comprising the source node, the destination node and at least one relay node from the plurality of nodes, wherein:

the at least one relay node is configured to transmit and receive the data via a Wi-Fi-based communication protocol using unassociated media access control (MAC) frames that utilize locally administered MAC addresses, and a MAC address field of the unassociated MAC frames comprises a group identifier corresponding to a group of the nodes without specifying a base service set identifier (BSS-ID); and providing, by the server, an indication of the relay path to at least one of the source node, the destination node, or the at least one relay node.

16. The non-transitory computer-readable medium of claim 15, wherein;

the operations further comprise performing a Wi-Fi beacon survey to receive the characteristics, and the characteristics comprise a periodicity at which data via Wi-Fi-based beacon MAC frames are received by the at least one relay node while unassociated with an access point.

17. The non-transitory computer-readable medium of claim 15, wherein at least one of the source node, the destination node, or the at least one relay node comprises at least one of:

an Internet-of-Things (IoT) device;

a television;

a sound bar;

a computing device;

an appliance; or a smart phone.

18. The non-transitory computer-readable medium of claim 15, wherein determining the relay path comprises:

providing a representation of the characteristics to a machine learning-based classification model; and receiving an output generated by the machine learning-based classification model that corresponds to the indication of the relay path.

19. The non-transitory computer-readable medium of claim 15, wherein the characteristics comprise at least one of:

a throughput for each of the plurality of nodes;

for each node of the plurality of nodes, a received signal strength with respect to one or more other nodes in the plurality of nodes;

for each node of the plurality of nodes, a signal-to-noise ratio with respect to the one or more other nodes in the plurality of nodes;

a modulation coding scheme utilized by each of the plurality of nodes;

an indication of operational behavior for each of the plurality of nodes; or for each node of the plurality of nodes, an indication of a periodicity at which a beacon signal is received from at least one other node of the plurality of nodes.

20. The non-transitory computer-readable medium of claim 15, wherein the at least one relay node comprises a first access point and a second access point communicatively coupled via the Internet.

* * * * *